United States Patent
Morelli et al.

(10) Patent No.: US 12,052,318 B1
(45) Date of Patent: Jul. 30, 2024

(54) CLUB MEMBER CONTROL OF COMMUNICATION PREFERENCES IN A MULTI-CLUB ENVIRONMENT

(71) Applicant: Clubster, LLC, Mercer Island, WA (US)

(72) Inventors: McRedmond Morelli, Mercer Island, WA (US); Patrick James Murray, Lancaster, OH (US); Bryan Freitas, Angra do Heroísmo (PT); William J. King, Dallas, TX (US)

(73) Assignee: Clubster, LLC, Mercer Island, WA (US)

( * ) Notice: Subject to any disclaimer, the term of this patent is extended or adjusted under 35 U.S.C. 154(b) by 0 days.

(21) Appl. No.: 18/100,420

(22) Filed: Jan. 23, 2023

(51) Int. Cl.
*G06F 15/16* (2006.01)
*H04L 67/306* (2022.01)

(52) U.S. Cl.
CPC ................... *H04L 67/306* (2013.01)

(58) Field of Classification Search
CPC .................................... H04L 67/306
USPC ........................................ 709/204
See application file for complete search history.

(56) References Cited

U.S. PATENT DOCUMENTS

| | | | | |
|---|---|---|---|---|
| 2010/0269158 A1* | 10/2010 | Ehler | .............. | G06F 16/9535 726/4 |
| 2012/0195325 A1* | 8/2012 | Connelly | .............. | H04L 51/214 370/432 |
| 2013/0018960 A1* | 1/2013 | Knysz | .............. | H04L 65/403 709/204 |
| 2021/0132749 A1* | 5/2021 | DeLanghe | .......... | H04L 67/1044 |

* cited by examiner

Primary Examiner — Alan S Chou (57) ABSTRACT

Techniques for club member control of communication preferences in a multi-club environment are described. A club member may belong to multiple clubs and may use a single facility to manage communication for those clubs. The communication facility may maintain a number of communication channels. The channels may be accessible via multiple types or modes of communication. Club members may configure communication preferences for at least some channels. Communication channels may be arranged in a dependency graph. A graphical user interface (GUI) for viewing and editing communication preferences may include a representation of the dependency graph and per channel preferences may include a preference to inherit preference settings from parent channels. Various operations associated with communication channels may involve traversing the dependency graph including determining preference values, propagating updates, displaying channel content and determining if a club staff member has permission to view a club member's communication preferences.

19 Claims, 10 Drawing Sheets

CLUB MEMBER CONTROL OF COMMUNICATION PREFERENCES IN A MULTI-CLUB ENVIRONMENT

BACKGROUND

Clubs are an enduring institution that bring people together for a variety of purposes. There are many kinds of clubs, some more formal, some informal, but most clubs have a need to communicate with their members and a desire to facilitate communication among members. Over the years different types and modes of communication have waxed and waned in popularity and more recently there has been a proliferation of types of computer-facilitated communication. Individuals may have preferred types and modes of communication depending on the club or activity, or just in general. Particular activities may lend themselves to particular types or modes of communication. This can lead to a complex communication environment that club members can find difficult or frustrating to navigate and to configure according to their needs and preferences, particularly when participating in multiple clubs with different communication cultures.

Embodiments described herein address these and other problems as will be apparent to one of skill in the art from the figures and description.

BRIEF DESCRIPTION OF THE DRAWINGS

The detailed description is depicted with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for club member control of communication preferences in a multi-club environment. A club member may belong to multiple clubs and may use a single facility to manage communication for those clubs. For example, the facility may be an internet-connected communication platform accessible via web browser, smart phone application ("app"), and/or any suitable mode of communication. The communication facility may maintain a number of communication channels, for example, one or more channels for each club and associated activity or interest groups, a unified communications channel that combines content from other channels, personal channels, and an emergency channel. At least some of the channels may be accessible via multiple types or modes of communication, for example, via smart phone app, web browser, email, instant messaging, voice, video and/or multi-media user interface. Club members may configure communication preferences for at least some channels, for example, preferred communication mode(s), communication mode preferences, channel aggregation preferences and channel priority.

Communication channels may be arranged in a hierarchy or dependency graph. For example, per club channels may be arranged beneath ("be child channels of") a unified communications channel for the club member, and interest group channels associated with particular clubs may be child channels of their associated club(s). A graphical user interface (GUI) for viewing and editing communication preferences may include a representation of the dependency graph and per channel preferences may include a preference to inherit preference settings from parent channels. Where updating preferences for one channel will result in updates to preferences for other channels, the GUI may visually indicate which channels will be affected by the update.

Communication preferences for channels may have default values set by an administrator. In at least some cases, club members may have different communication preference default values. Current communication preference values may be different from default values. The communication preference GUI may display these different types of values and allow club members to edit at least some of them.

In at least some cases, clubs may have staff members who may have data access privileges enabling them to assist club members including with communication preferences. In the multi-club communication environment, such staff members may be inhibited from viewing communication preferences for channels that are not child channels of their associated club channel. Some channels, for example, the multi-club unified communications channel may not be viewable by any staff member and, in accordance with at least one embodiment, club members requiring communication preference assistance with such channels may need to contact an assistant, administrator or other authorized user associated with the multi-club communication environment itself.

In accordance with at least one embodiment, various operations associated with communication channels may involve traversing the dependency graph. For example, determining communication preferences for a channel may involve determining the communication preferences of one or more parent channels. Updates to the communication preferences of a channel may result in updates to one or more child channels. Displaying content for a channel may include display content associated with one or more child channels. Determining if a club staff member has permission to view and/or edit communication preferences for a channel may involve determining whether the channel is a child channel of the club channel.

These techniques may provide club members with consistent, understandable, convenient, efficient and/or effective means for managing communication preferences in a multi-club communication environment. Further details are now described with reference to the figures.

Figure 1:
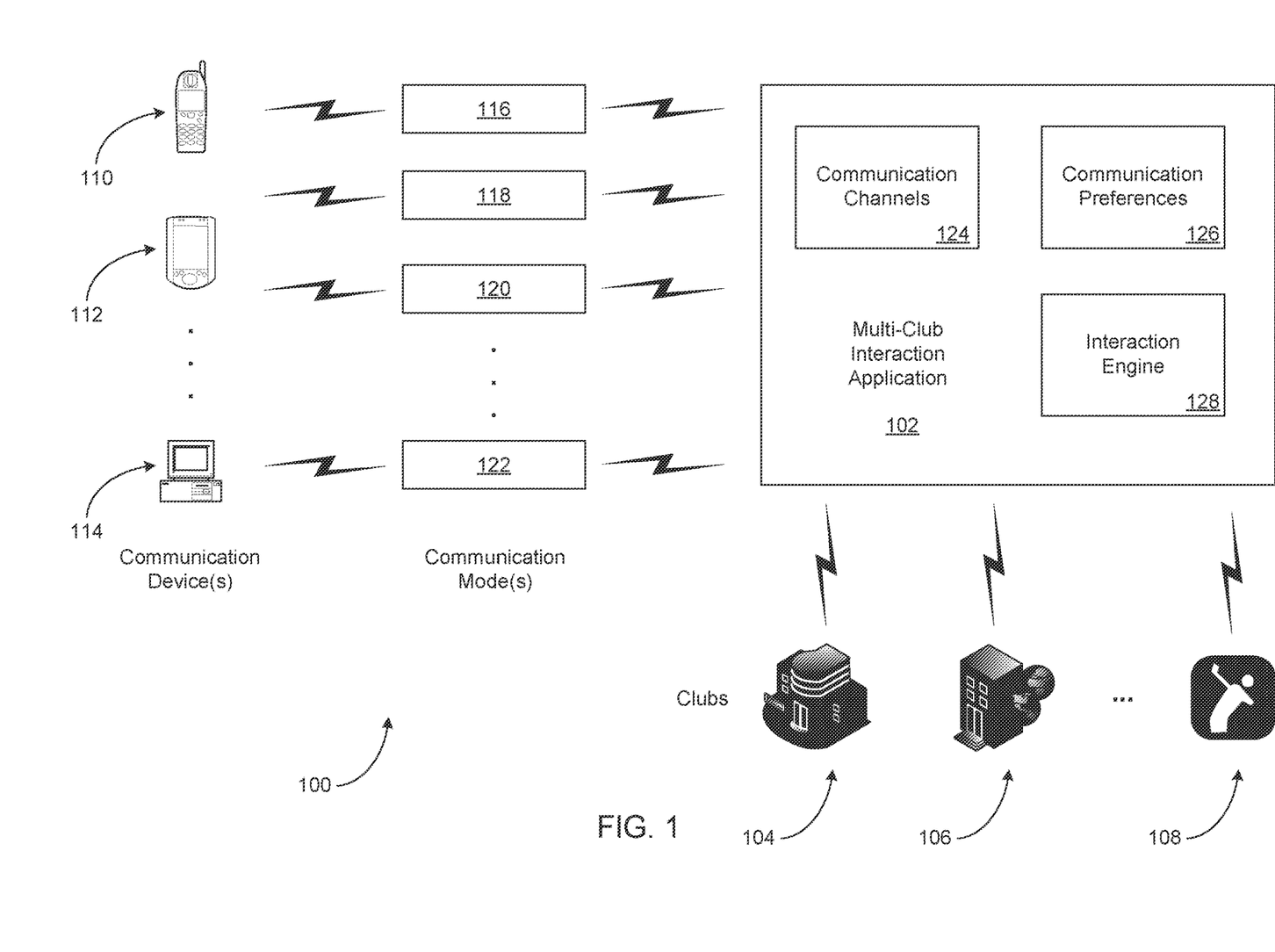
FIG. 1 is a schematic diagram illustrating aspects of an example computer systems architecture in accordance with at least one embodiment.

FIG. 1 depicts aspects of an example computer systems architecture in accordance with at least one embodiment. A multi-club communication environment 100 may include a multi-club interaction application 102 that facilitates club member interaction with multiple clubs 104, 106, 108. As is conventional, the ellipsis is used throughout the figures to indicate that there may be any suitable number of the indicated object. For example, although FIG. 1 shows three clubs 104, 106, 108, the multi-club interaction application may support any suitable number of clubs. As the term is used herein, a club is an organization of people with a common interest or goal such as a social club, a sports club, a buying club or a charitable club. Clubs 104, 106, 108 may have physical facilities in one or more locations and/or a virtual presence. Clubs 104, 106, 108 may host scheduled and unscheduled events and/or meetings, publish news about events, and otherwise promote their common interest or goal. Clubs 104, 106, 108 may have staff members that assist club members with club matters such as event reservations and obtaining club information.

Club members may use any suitable communication device 110, 112, 114 to communicate with the multi-club interaction application 102 including phones, smart phones and computing devices. In addition, club members may use a variety of communication modes 116, 118, 120, 122 to communicate with the multi-club interaction application 102. Particular devices 110, 112, 114 may be able to use one or more of the communication modes 116, 118, 120, 122 depending on the device's capabilities. For example, a smart phone might be able to communicate with the multi-club interaction application 102 using a smart phone app, a web browser user interface, email, instant messaging, text messaging, voice call, video call and/or multi-media content, while other devices may have different communication mode options.

The multi-club interaction application 102 may maintain multiple communication channels with a communication channels module 124, described in more detail below with reference to FIG. 3. For example, there may be at least one communication channel for each club 104, 106, 108 and/or at least one unified communications channel for each club member. Of course, different users of the multi-club interaction application 102 may belong to different ones of the clubs 104, 106, 108. Club member communication preferences may be managed with a communication preferences module 126, described in more detail below with reference to FIG. 4. Communication preferences may apply to individual channels, all of a club member's channels and/or all communications with the multi-club interaction application 102. An interaction engine 128 may control communication with the channels such that the communication occurs in accordance with the configured communication preferences.

Figure 2:
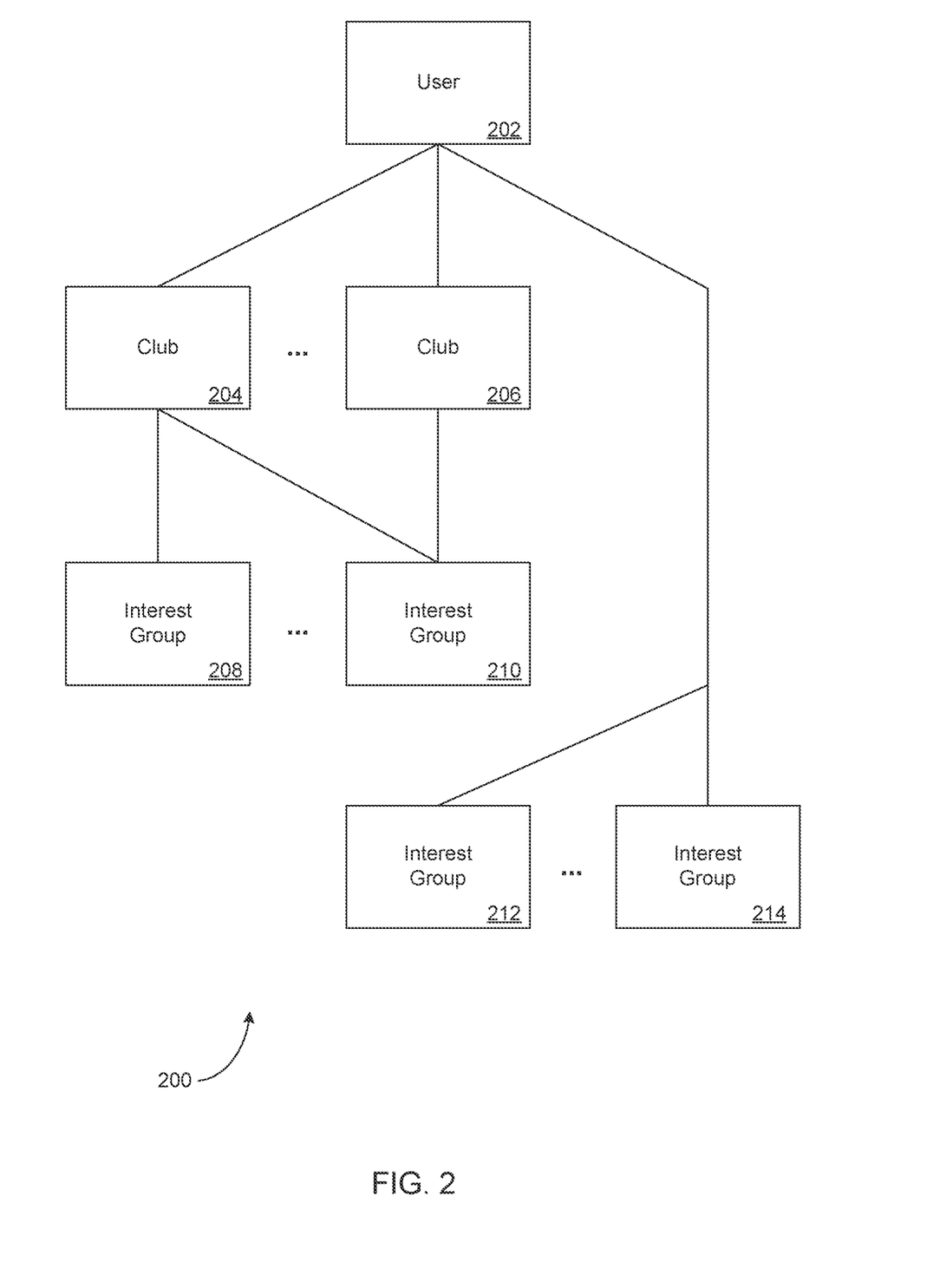
FIG. 2 is a schematic diagram illustrating aspects of an example communication channel dependency graph in accordance with at least one embodiment.

To assist with club member management of communication preferences, communication channels may be arranged in a logical dependency graph. FIG. 2 depicts aspects of an example communication channel dependency graph 200 in accordance with at least one embodiment. The example graph 200 shows a user channel 202 at a top level, with multiple club channels 204, 206 as child channels of the user channel 202. The example graph 200 also includes multiple interest group channels 208, 210, 212, 214. The interest group channels 208, 210 are child channels of the club channels 204, 206, while the interest group channels 212, 214 are child channels of the user channel 202. The interest group channel 208 is a child channel of a single club channel 204, while the interest group channel 210 is a child channel of multiple club channels 204, 206. In accordance with at least one embodiment, a dependency graph 200 is maintained for each club member.

The arrangement of the channels 202, 204, 206, 208, 210, 212, 214 in the dependency graph 200 may assist club member management of communication preferences in multiple ways. For example, the club member may configure a channel to include content from child channels so that the user channel 202 may be configured to be a unified communications channel that includes content from each of the club channels 204, 206 and/or the club channel 204 may be configured to include content from associated child interest group channels 208, 210. As another example, child channels may inherit communication preferences from parent channels so that communication preferences for child channels may be managed by configuring the preferences for one or a small number of parent channels. Such inheritance may itself be a preference, allowing for child channel preference overrides, and may occur when the channel is added to the club member's dependency graph 200 and/or when a communication preference of a parent channel is updated. As yet another example, the dependency graph 200 may govern who can view and/or edit communication preferences associated with different channels. For example, staff members of the club associated with the club channel 204 may be able to view and/or edit communication preferences associated with child interest group channels 208, 210, but staff members of the club associated with the club channel 206 may be inhibited from viewing and/or editing communication preferences for interest group channel 208 because it is not a child channel of club channel 206 in dependency graph 200. This can give club members more control over their privacy while being able to obtain assistance when appropriate.

Figure 3:
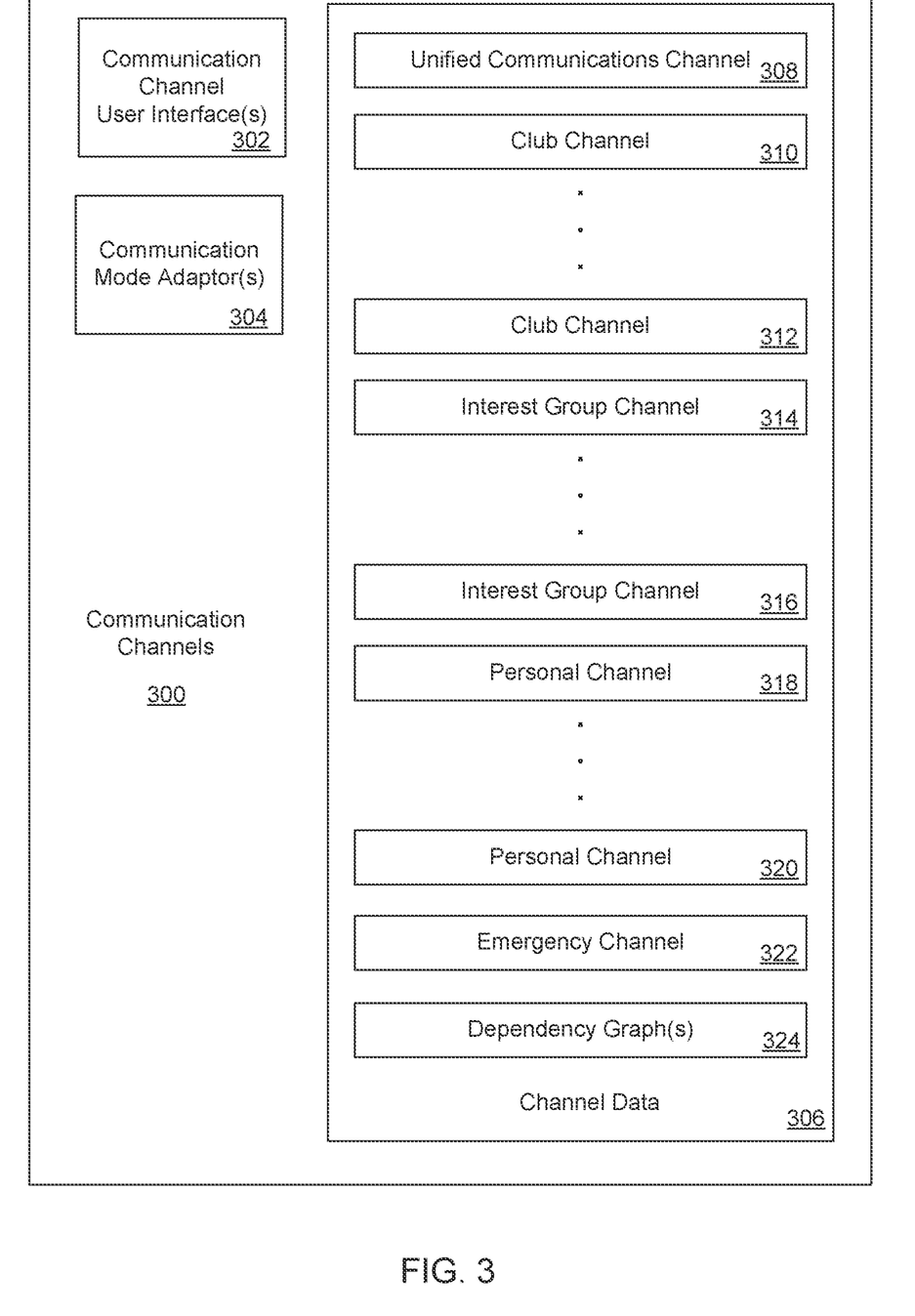
FIG. 3 is a schematic diagram illustrating aspects of an example communication channels module in accordance with at least one embodiment.

FIG. 3 depicts aspects of an example communication channels module 300 in accordance with at least one embodiment. The communication channels module 300 is an example of the communication channels module 124 of FIG. 1. The communication channels module 300 may implement one or more communication channel user interfaces 302 such as graphical user interfaces (GUIs), voice user interfaces (VUIs) and application programming interfaces (APIs). Club members may access and create channel content using the user interface(s) 302. In accordance with at least one embodiment, club members may also use the user interface(s) 302 to create, edit and delete new channels, for example, new interest group channels 208, 210, 212, 214 (FIG. 2). Some channels may have a default or standardized communication mode and the communication channels module 300 may implement one or more communication mode adaptors 304 to support alternative communication modes. For example, the default communication mode for a club channel may be a public news feed viewable with a web browser and the communication mode adaptors 304 may include an adaptor to enable interaction with the club channel via email.

The communication channels module 300 may maintain channel data 306 containing and/or referencing channel content and configuration data. For clarity, FIG. 3 shows example channel data 306 that may be maintained for each club member, however as will be apparent to one of skill in the art, the communication channels module 300 may maintain channel data for channels accessed by all users including all club members and the per club member channel data 306 may represent a view or slice of the all user data. The channel data 306 may include a unified communications channel 308, multiple club channels 310, 312, multiple interest group channels 314, 316, multiple personal channels 318, 320, an emergency channel 322 and one or more dependency graphs 324. For example, the unified communications channel 308 may correspond to the user channel 202 of FIG. 2, the club channels 310, 312 may correspond to the club channels 204, 206, the interest group channels 314, 316 may correspond to the interest group channels 208, 210, 212, 214, and the dependency graph 324 may correspond to the dependency graph 200. Personal channels 318, 320 may be configured as an addressable message "inbox" not necessarily intended for group discussions, while the emergency channel 322 may have certain settings that cannot be overridden to ensure that emergency information is timely communicated to the club member.

Figure 4:
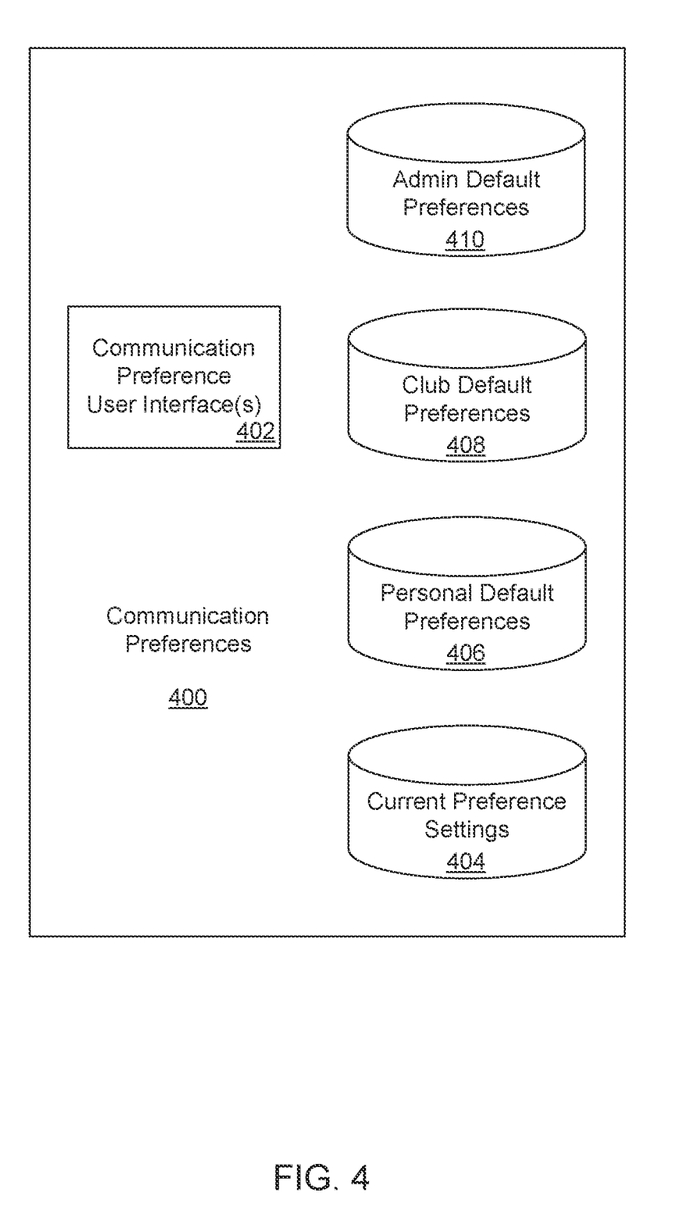
FIG. 4 is a schematic diagram illustrating aspects of an example communication preferences module in accordance with at least one embodiment.

FIG. 4 depicts aspects of an example communication preferences module 400 in accordance with at least one embodiment. The communication preferences module 400 is an example of the communication channels module 126 of FIG. 1. The communication preferences module 400 may implement one or more communication preference user interfaces 402 such as graphical user interfaces (GUIs), voice user interfaces (VUIs) and application programming interfaces (APIs). Club members may use the communication preference user interface(s) 402 to view and edit current preference settings 404 as well as personal default preferences 406. For example, a club member's personal default preferences 406 may specify communication preference values to be used when the club member joins a communication channel for the first time.

In accordance with at least one embodiment, club staff and/or an authorized user of the multi-club interaction application 102 (FIG. 1) may use the communication preference user interface(s) 402 to view and edit some communication preferences of some club members (as well as their own communication preferences). For example, staff members may view and edit communication preferences associated with channels that are in their club's dependency subgraph(s) (e.g., the club channel and its child channels) in order to provide assistance to their club members. In addition, staff members may be authorized to view and edit club default preferences 408 that may be used for new channels that are created for their club. In accordance with at least one embodiment, some club default preferences 408 may be flagged as not overridable by club members.

Administrators and/or other authorized users of the multi-club interaction application 102 may set default preferences 410 that apply to any suitable channel accessible with the multi-club interaction application 102 including club-independent channels such as the unified communications channel 308 (FIG. 3), the personal channels 318, 320 and the emergency channel 322. Some preferences may be flagged as not overridable by club staff and/or club members. Where suitable, the default preferences 406, 408, 410 may include separate sets of default values for different types of communication channel. The current preference settings 404 may include current preference values for each channel maintained by the multi-club interaction application 102 and/or for each user. If a user has not changed a preference value from its default value, the value may be determined by obtaining the corresponding value from admin default preferences 410, then if overridable and associated with a club, overriding with the value from club default preferences 408, then if still overridable, overriding with the value from personal default preferences 406.

Figure 5:
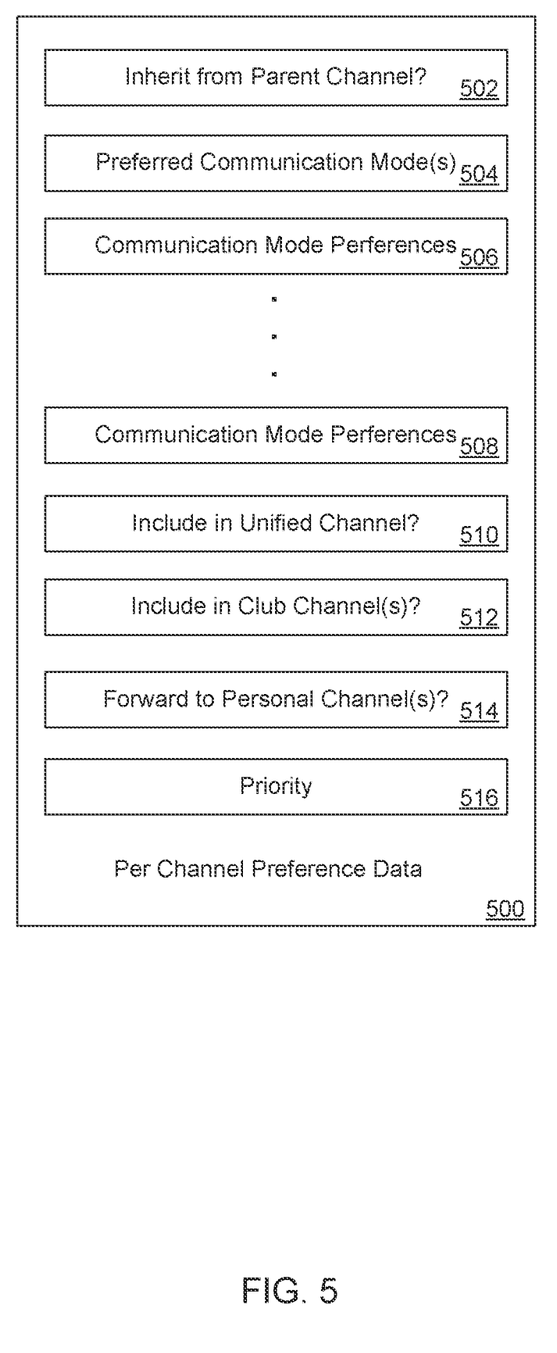
FIG. 5 is a schematic diagram illustrating aspects of an example per channel preference data in accordance with at least one embodiment.

FIG. 5 depicts aspects of example per channel preference data 500 in accordance with at least one embodiment. The example per channel preference data 500 may include an inherit from parent channel preference 502. For example, the inherit from parent channel preference 502 may indicate that, if the associated channel has a parent channel, then the associated channel should or should not inherit (e.g., copy) preference values for the channel from the preference values of the parent channel. The preference 502 may have separate indicators for whether to inherit when the channel is newly associated with a club member and whether to inherit ongoing changes to the preferences of the parent channel. The preference 502 may further indicate which preferences should be inherited.

The per channel preference data 500 may include a preferred communication mode(s) preference 504. For example, the preferred communication mode(s) preference 504 may indicate one or more preferred communication modes out of the set of communication modes 116, 118, 120, 122 available for the channel. Where multiple preferred communication modes are indicated, they may be ordered by priority should some communication modes become unavailable. Alternatively, or in addition, some channels may simultaneously communicate with each of the preferred communication modes (e.g., via smart phone app and also email). The per channel preference data 500 may also include communication mode preferences 506, 508 corresponding to each of the communication modes 116, 118, 120, 122 available for the channel. For example, email preferences may specify how often to send emails, while web browser preferences may specify preferred font size.

The per channel preference data 500 may include one or more preferences indicating whether or not channel content should be available via a parent channel. For example, the per channel preference data 500 may include an include in unified channel preference 510 and an include in club channel(s) preference 512. In accordance with at least one embodiment, each club channel 310, 312 (FIG. 3) is included in the unified communications channel 308 by default and the include in unified channel preference 510 can be used to change that behavior on a per channel basis, for example, the preference explicitly indicates non-inclusion to opt out of inclusion. Similarly, interest group channels that are child channels of a club channel may be available from the parent channel by default and the include in club channel(s) preference 512 can be used to change that. This functionality enables a club member to access the content of their channels without having to necessarily explicitly select a particular channel, while at the same time enabling separation of channel content when desired.

The per channel preference data 500 may include a forward to personal channel(s) preference 514 which may indicate that content of a particular channel should be accessible via one or more personal channels 318, 320 (FIG. 3). This can be used by club members for organization of channel content and/or to associated channel content with particular communication modes. The per channel preference data 500 may include a priority preference 516 indicating a priority associated with content of the channel (e.g., high, normal, low, urgent). Such priority indicators may be in turn used by some communication modes to prioritize content delivery in accordance with club member preferences.

Having described modules, components and structures in more detail, the description now turns to example process that may be performed by with those modules, components and structures to provide club member control of communication preferences in a multi-club environment.

Figure 6:
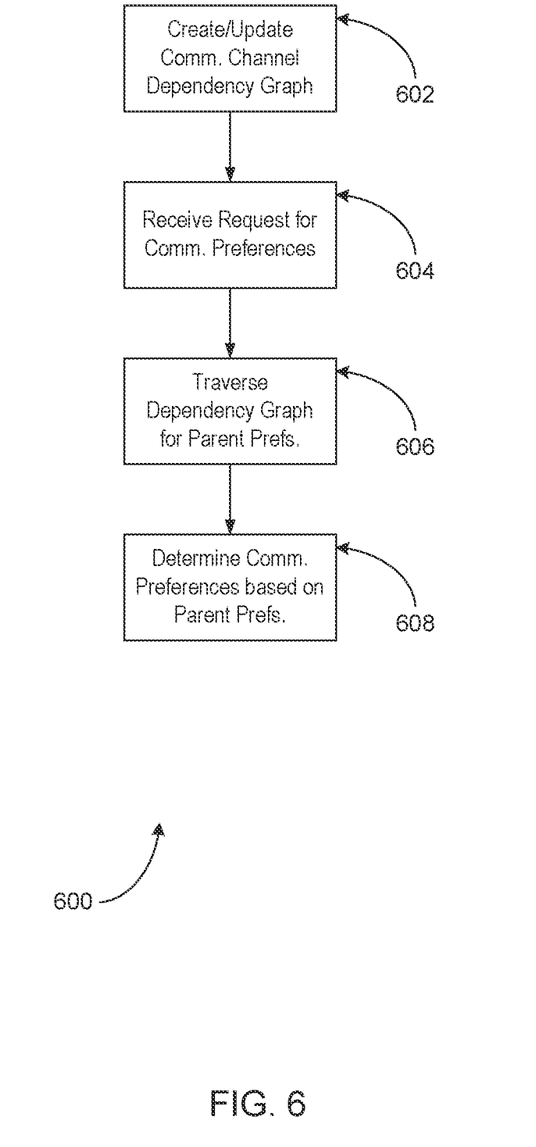
FIG. 6 is a flow diagram illustrating an example process for determining communication preferences in accordance with at least one embodiment.

FIG. 6 depicts an example process 600 for determining communication preferences in accordance with at least one embodiment. At 602, a communication channel dependency graph may be created or updated. For example, a club member may join clubs and channels such that the dependency graph 200 (FIG. 2) is established. At 604, a request for communication preferences may be received. For example, the interaction engine 128 (FIG. 1) may request communication preferences for a channel from the communication preferences module 126. At 606, a dependency graph may be traversed to determine corresponding communication preferences for one or more parent channels. For example, the request of 604 may have specified the interest group channel 208. The dependency graph 200 may be traversed by the communication preferences module 126 to identify parent channels 204, 202. The traversal may occur at any suitable time, for example, it may occur whenever the dependency graph is updated and the results cached.

At 608, communication preferences for the channel may be determined based at least in part on corresponding communication preferences for the parent channels identified at 606. For example, the communication preferences module 126 (FIG. 1) may check parent channels for non-overridable preferences and/or for changes to default preferences. Continuing the example using dependency graph 200, if preferences for channel 208 and channel 204 have not been changed from default, then the preference values for channel 202 may be used for channel 208. If a preference is identified as non-overridable at channel 202 and/or channel 204, its value may be used for channel 208. In the case of channel 210 which is a child channel of multiple parent channels, some preferences may conflict and may require club member assistance to resolve if automated conflict resolution is not possible.

Figure 7:
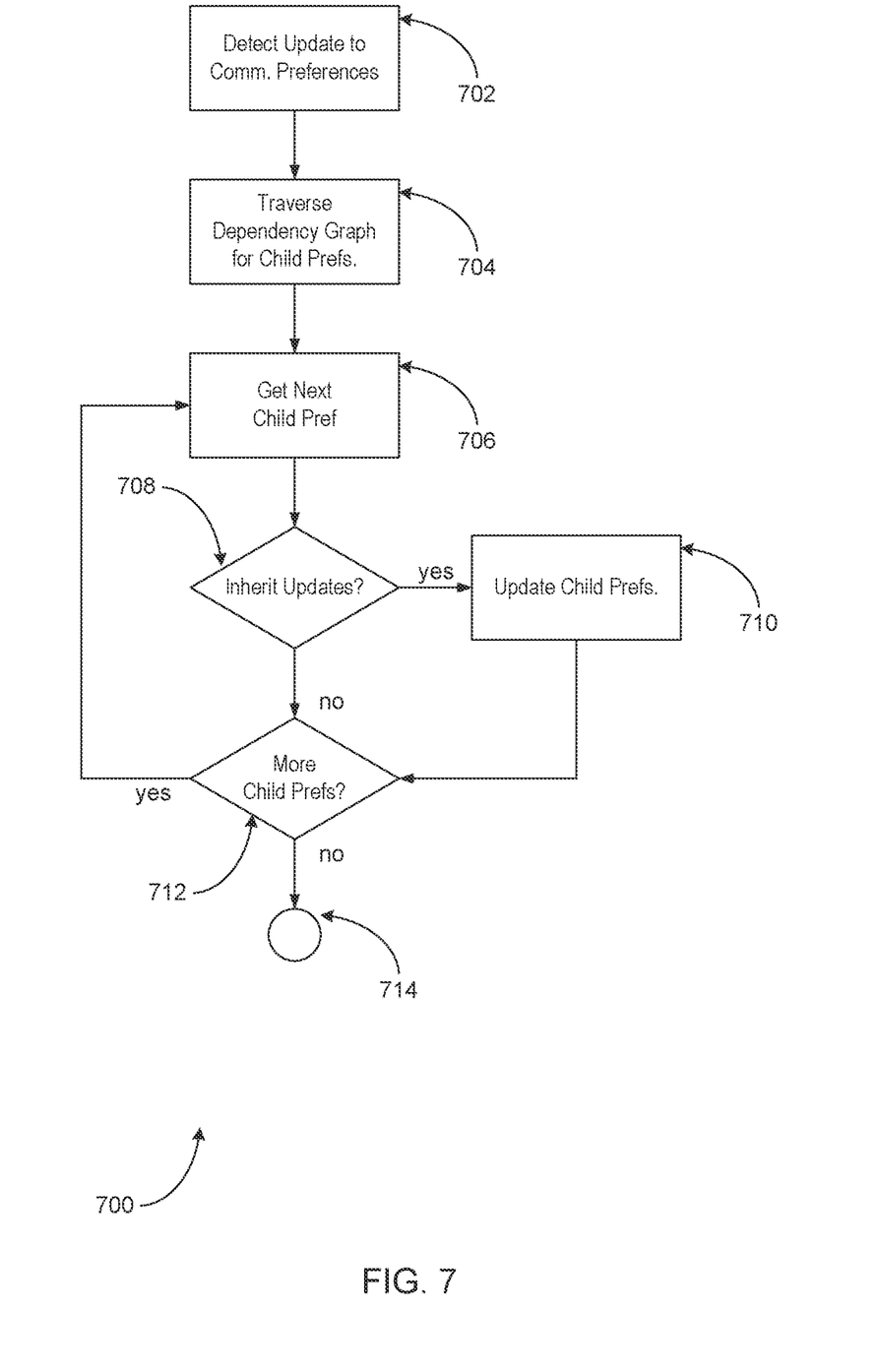
FIG. 7 is a flow diagram illustrating an example process for updating communication preferences in accordance with at least one embodiment.

The process 600 may be utilized to determine preference values without necessarily copying and/or updating preference values associated with child channels. However, at times it is appropriate to maintain a separate instance of preferences for at least some child channels, which may need updating when a parent preference value changes to propagate the changes as expected. FIG. 7 depicts an example process 700 for updating communication preferences in accordance with at least one embodiment. At 702, an update to communication preferences of a channel may be detected. For example, the communication preferences module 126 (FIG. 1) may detect that it is being used to update communication preferences associated with channel 202 (FIG. 2). At 704, a dependency graph may be traversed to identify any communication preferences associated with child channels. For example, the communication preferences module 126 may traverse the dependency graph 200 to identify that channels 204, 206, 212, 214 may be affected by the update.

At 706, a set of communication preferences associated with a next (and/or a first) child channel may be selected. At 708, it may be determined whether the selected set of communication preferences indicates whether or not the child channel should inherit updates from its parent channel(s). For example, the communication preferences module 126 (FIG. 1) may check the inherit from parent channel preference 502 (FIG. 5) for the selected channel. If the channel should inherit updates, the process may progress to 710. Otherwise, the process may progress to 712. At 710, the preference values of the selected child channel may be updated based at least in part on the update detected at 702. Note that this may trigger additional update detections and additional performances of the process 700 over the subgraph rooted at the selected child channel. As will be apparent to one of skill in the art, equivalent non-recursive implementations of process 700 are possible and may improve computing performance. After performing 710, the process may progress to 712.

At 712, it may be determined whether there are additional child channels to check. If so, the process may progress to 706. Otherwise, the process may progress to a different process via 714.

Figure 8:
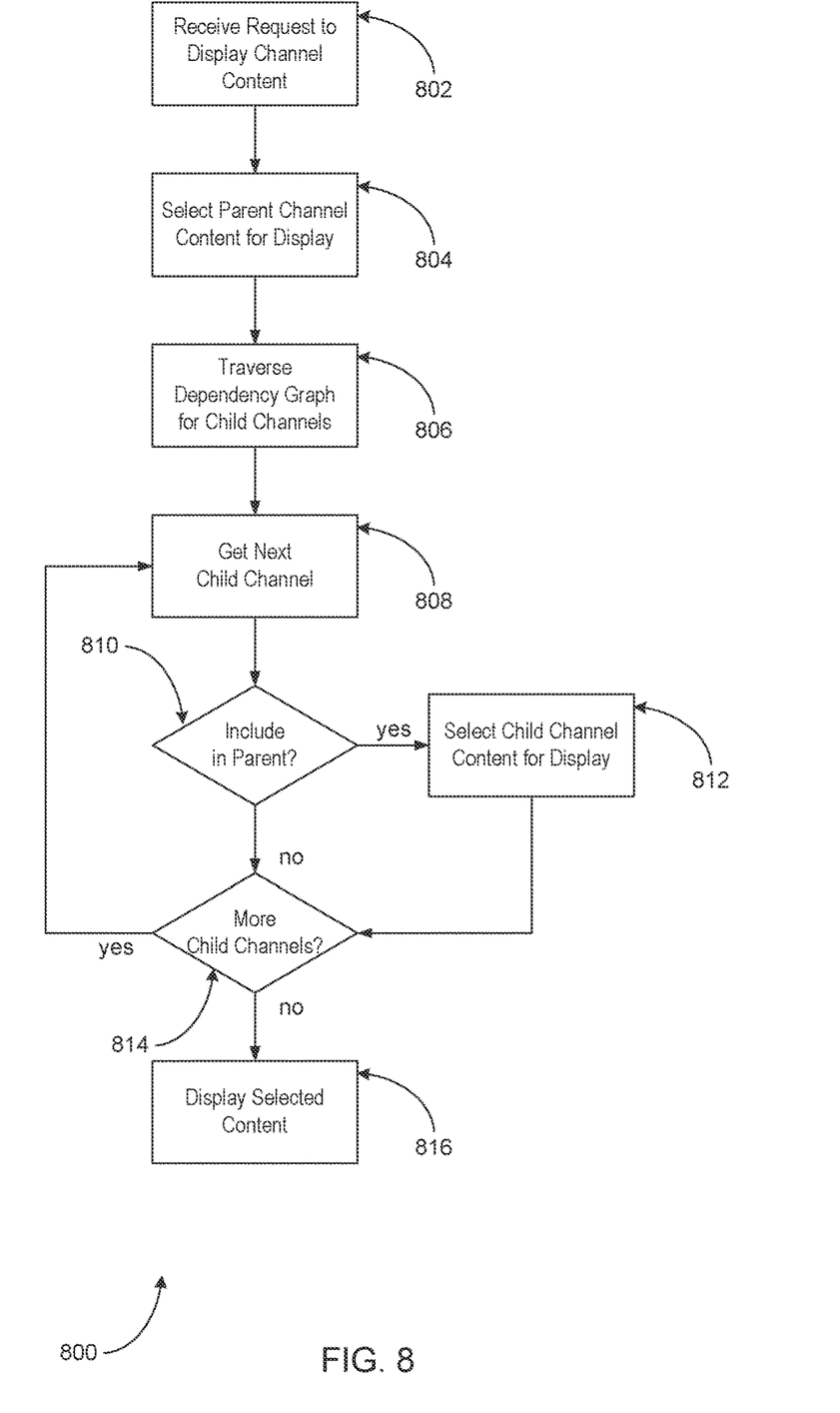
FIG. 8 is a flow diagram illustrating an example process for displaying communication channel content in accordance with at least one embodiment.

As well as determining preference values, a dependency graph may also determine what content is displayed when a channel is viewed. FIG. 8 depicts an example process 800 for displaying communication channel content in accordance with at least one embodiment. At 802, a request to display channel content may be received. For example, the request may be received at the communication channel user interface 302 (FIG. 3). The request may specify a channel, for example, channel 202 (FIG. 2). At 804, content associated with the specified channel may be selected for display. In this example, the specified channel is a parent channel. If that is not the case, the process 800 may progress directly to 816 (not shown in FIG. 8 for clarity).

At 806, a dependency graph may be traversed to identify child channels. In this example, the dependency graph 200 (FIG. 2) may be traversed to identify child channels 204, 206, 212, 214. At 808, a set of communication preferences associated with a next (and/or a first) child channel may be selected. At 810, it may be determined whether the selected set of communication preferences indicates whether or not content of the child channel should be included when displaying the parent channel. For example, the communication channel user interface 302 (FIG. 3) may check the include in unified channel preference 510 (FIG. 5) and/or the include in club channel(s) preference 512. If so, the process 800 may progress to 812. Otherwise, the process 800 may progress to 814. At 814, content of the child channel should be selected for display along with the content of the parent channel. Then the process 800 may progress to 814. Note that 814 may trigger additional requests to display channel content and additional performances of the process 800 over the subgraph rooted at the selected child channel. As will be apparent to one of skill in the art, equivalent non-recursive implementations of process 800 are possible and may improve computing performance At 814, it may be determined whether there are additional child channels to check. If so, the process 800 may progress to 808. Otherwise, the process 800 may progress to 816. At 816, the selected content may be displayed, for example, by the communication channel user interface 302 (FIG. 3). The format and order of the displayed content may be determined in accordance with the parent channel's communication preferences and/or the associated communication mode.

Figure 9:
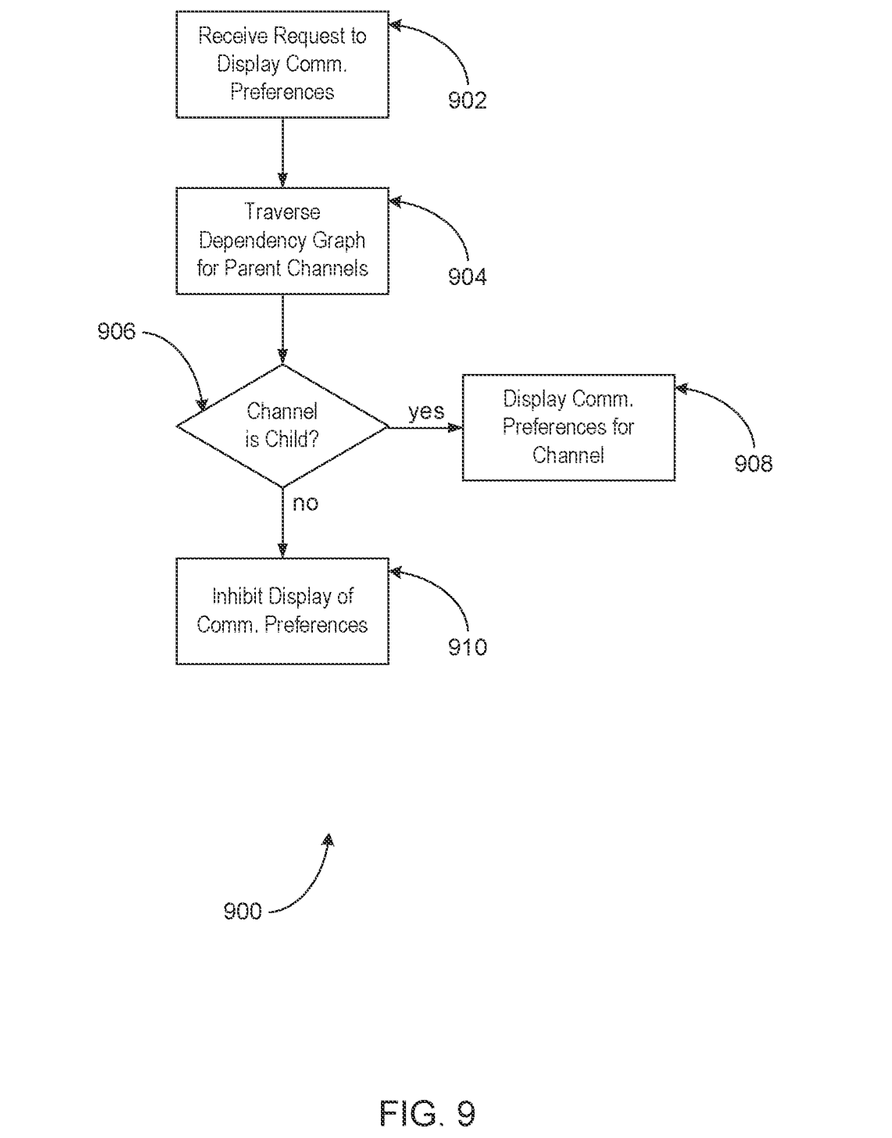
FIG. 9 is a flow diagram illustrating an example process for displaying communication preferences in accordance with at least one embodiment.

At times club members may need assistance with configuring their communication preferences. Part of the challenge of the multi-club communication environment is preserving privacy while enabling club members to get appropriate assistance. For example, club staff should only be able to view communication preferences associated with their club. FIG. 9 depicts an example process 900 for displaying communication preferences in accordance with at least one embodiment. At 902, a request to display communication channel preferences may be received. For example, the request may be received via the communication preference user interface(s) 402 (FIG. 4) from a club staff member.

At 904, a dependency graph may be traversed to identify parent channels. For example, the request of 902 may specify a channel associated with the communication preferences to be displayed. In this example, the channel 208 (FIG. 2) is specified and the dependency graph 200 may be traversed to identify the parent channel 204, which is a club channel. At 906, it may be determined whether or not the specified channel is a child of a qualifying channel. If so, the process 900 may progress to 908. Otherwise, the process 900 may progress to 910. Continuing the example, if the requesting staff member is a staff member of the club associated with channel 204, then channel 208 is the child of a qualifying channel. However, if the requesting staff member is a staff member of the club associated with channel 206, then channel 208 is not the child of a qualifying channel.

At 908, the club member's communication preferences may be displayed. At 910, display of the club member's communication preferences may be inhibited. For example, a staff member at the club associated with channel 204 (FIG. 2) will be able to see the club member's communication preferences and assist the club member in configuring those preferences, while a staff member at the club associated with channel 206 will not be able to view the preferences and will not be able to assist. In the latter case, the staff member may escalate the assistance request to an authorized user of the multi-club interaction application 102 (FIG. 1) to help resolve the problem and/or the application 102 may automatically identify that the club member needs a staff member of the club associated with channel 204 and transfer the assistance request. In displaying all or part of sets of communication preferences, the communication preference user interface(s) 402 (FIG. 4) may display a visual representation of the dependency graph 200 to make the relationships between different sets of communication preferences clear.

Figure 10:
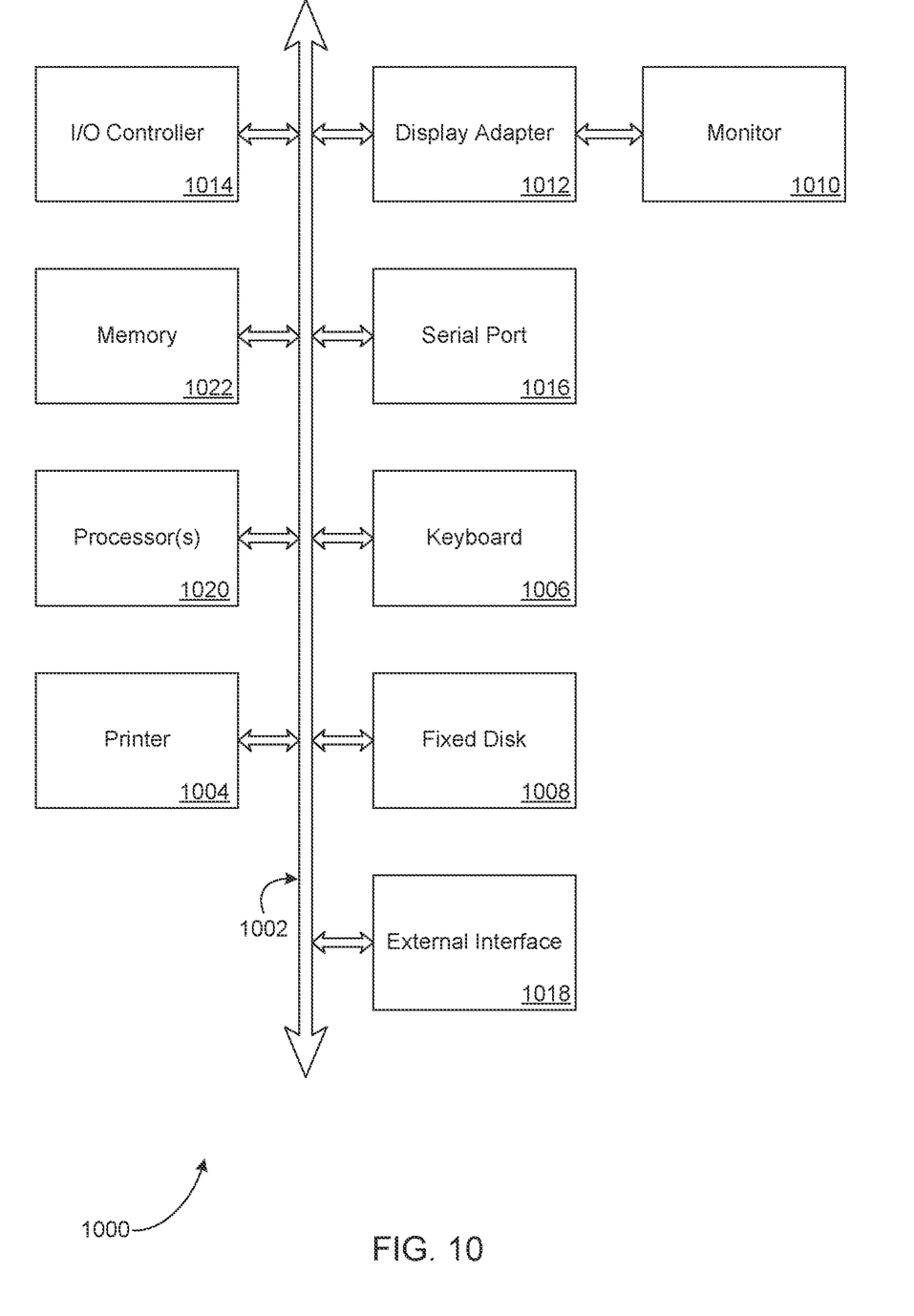
FIG. 10 is a schematic diagram illustrating aspects of an example computer in accordance with at least one embodiment.

In accordance with at least some embodiments, the system, apparatus, methods, processes and/or operations for message coding may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 10 depicts aspects of elements that may be present in a computer device and/or system 1000 configured to implement a method and/or process in accordance with some embodiments of the present invention. The subsystems shown in FIG. 10 are interconnected via a system bus 1002. Additional subsystems such as a printer 1004, a keyboard 1006, a fixed disk 1008, a monitor 1010, which is coupled to a display adapter 1012. Peripherals and input/output (I/O) devices, which couple to an I/O controller 1014, can be connected to the computer system by any number of means known in the art, such as a serial port 1016. For example, the serial port 1016 or an external interface 1018 can be utilized to connect the computer device 1000 to further devices and/or systems not shown in FIG. 10 including a wide area network such as the Internet, a mouse input device, and/or a scanner. The interconnection via the system bus 1002 allows one or more processors 1020 to communicate with each subsystem and to control the execution of instructions that may be stored in a system memory 1022 and/or the fixed disk 1008, as well as the exchange of information between subsystems. The system memory 1022 and/or the fixed disk 1008 may embody a tangible computer-readable medium.

It should be understood that the present invention as described above can be implemented in the form of control logic using computer software in a modular or integrated manner. Alternatively, or in addition, embodiments of the invention may be implemented partially or entirely in hardware, for example, with one or more circuits such as electronic circuits, optical circuits, analog circuits, digital circuits, integrated circuits ("IC", sometimes called a "chip") including application-specific ICs ("ASICs") and field-programmable gate arrays ("FPGAs"), and suitable combinations thereof. In particular, the encoder and/or decoder describe above with reference to FIG. 2 may be partially or entirely implemented in hardware. As will be apparent to one of skill in the art, notions of computational complexity and computational efficiency may be applied mutatis mutandis to circuits and/or circuitry that implement computations and/or algorithms. Based on the disclosure and teachings provided herein, a person of ordinary skill in the art will know and appreciate other ways and/or methods to implement the present invention using hardware and/or a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A computer-implemented method for club member control of communication preferences in a multi-club environment, comprising:
 referencing a plurality of communication channels that each correspond to a node in a dependency graph such that at least a first communication channel is a child communication channel that corresponds to a child node of a parent node that corresponds to a second communication channel;
 determining a second set of communication preferences associated with the second communication channel by accessing the parent node that corresponds to the second communication channel;
 traversing the dependency graph along an edge between the child node that corresponds to the first communication channel and the parent node that corresponds to the second communication channel;
 based on traversing the dependency graph, determining inherency data indicating whether the first communication channel should inherit a portion of the second set of communication preferences associated with the second communication channel;
 based on the inherency data indicating that the first communication channel should inherit the portion of the second set of communication preferences associated with the second communication channel, determining a first set of communication preferences for the first communication channel based at least in part on the second set of communication preferences associated with the second communication channel, the first set of communication preferences being different from the second set of communication preferences;
 enabling communication with the first communication channel in accordance with the first set of communication preferences; and
 enabling communication with the second communication channel in accordance with the second set of communication preferences.

2. The computer-implemented method of claim 1, wherein:
 responsive to the inherency data indicating that the first communication channel should inherit the portion of the second set of communication preferences associated with the second communication channel, the computer-implemented method further comprises setting default values for the first set of communication preferences based at least in part on corresponding current values of the second set of communication preferences.

3. The computer-implemented method of claim 1, wherein:
 responsive to the inherency data indicating that the first communication channel should inherit the portion of the second set of communication preferences associated with the second communication channel, the computer-implemented method further comprises:
  detecting an update to a value of the second set of communication preferences; and
  updating a corresponding value of the first set of communication preferences based at least in part on the updated value of the second set of communication preferences.

4. The computer-implemented method of claim 1, wherein:
 communication with the first communication channel includes receiving first content addressed to the first communication channel;
 communication with the second communication channel includes receiving second content addressed to the second communication channel;
 the first set of communication preferences include a preference to include channel content in a parent channel; and
 responsive to the preference to include channel content in a parent channel, the computer-implemented method further comprises:
  receiving a request to display content associated with the second communication channel; and
  responsive to the request, displaying first content addressed to the first communication channel and second content addressed to the second communication channel.

5. The computer-implemented method of claim 4, wherein:
 the preference to include channel content in a parent channel comprises a preference to include channel message in a unified communications channel; and
 the second communication channel comprises the unified communications channel.

6. The computer-implemented method of claim 5, wherein, responsive to the request to display content associated with the unified communications channel, content associated with the plurality of communication channels are displayed except communication channels for which the preference to include channel content in the unified channel indicates non-inclusion.

7. The computer-implemented method of claim 1, wherein:
 the first communication channel is associated with a plurality of communication modes;
 the first set of communication preferences includes one or more preferred communication modes of the plurality of communication modes; and
 enabling communication with the first communication channel includes enabling communication with the first communication channel in accordance with the one or more preferred communication modes.

8. The computer-implemented method of claim 7, wherein the plurality of communication modes includes one or more of: smart phone app, web browser user interface, a public post feed, comments to a public post, private messages, email, instant messaging, text messaging, voice and multi-media content.

9. The computer-implemented method of claim 1, wherein:
 the plurality of communication channels includes a first club communication channel associated with a first club having a plurality of club members including at least one staff member; and
 the at least one staff member is able to view individual club member communication preferences associated with the club communication channel and at least one communication channel that depends on the club communication channel in the dependency graph.

10. The computer-implemented method of claim 9, wherein:
 a club member of the plurality of club members belongs to the first club and a second club associated with a second club communication channel of the plurality of communication channels;

the second club communication channel is not dependent on the first club communication channel in the dependency graph; and the at least one staff member is inhibited from viewing communication preferences of the club member that are associated with the second club communication channel.

11. The computer-implemented method of claim 10, wherein:
the club member is associated with a multi-club communication channel providing access to first content addressed to the first club communication channel and second content addressed to the second club communication channel;
the at least one staff member is inhibited from viewing communication preferences of the club member that are associated with the multi-club communication channel; and
an authorized user of a multi-club communication environment is able to view communication preferences of the club member that are associated with the multi-club communication channel, the authorized user being different from staff members of the first club and the second club.

12. The computer-implemented method of claim 1, further comprising:
receiving a request to display communication preferences associated with the plurality of communication channels; and
in response to the request, displaying a visual representation of a relationship between the first set of communication preferences and the second set of communication preferences, the visual representation including a representation of the dependency graph.

13. The computer-implemented method of claim 1, further comprising:
receiving a request to display the first set of communication preferences;
in response to the request, displaying a visual representation of the first set of communication preferences, the visual representation including:
a visual indication of individual communication preferences in the first set of communication preference;
a visual indication of individual preference values corresponding to the individual communication preferences; and
a visual indication of a dependency graph relationship between the first set of communication preferences and the second set of communication preferences.

14. The computer-implemented method of claim 1, further comprising:
receiving a request to update at least one preference value of the second set of communication preferences;
in response to the request, displaying a visual representation of at least one other set of communication preferences to be updated, the visual representation including a visual representation of a dependency graph relationship between the second set of communication preferences and the at least one other set of communication preferences.

15. One or more computer-readable media collectively having stored thereon computer-executable instructions that when executed with one or more computers, cause the one or more computers to collectively, at least:
reference a plurality of communication channels that each correspond to a node in a dependency graph such that at least a first communication channel is a child communication channel that corresponds to a child node of a parent node that corresponds to a second communication channel;
determine a second set of communication preferences associated with the second communication channel by accessing the parent node that corresponds to the second communication channel;
traverse the dependency graph along an edge between the child node that corresponds to the first communication channel and the parent node that corresponds to the second communication channel;
based on traversing the dependency graph, determine inherency data indicating whether the first communication channel should inherit a portion of the second set of communication preferences associated with the second communication channel;
based on the inherency data indicating that the first communication channel should inherit the portion of the second set of communication preferences associated with the second communication channel, determine a first set of communication preferences for the first communication channel based at least in part on the second set of communication preferences associated with the second communication channel, the first set of communication preferences being different from the second set of communication preferences;
facilitate communication with the first communication channel in accordance with the first set of communication preferences; and
facilitate communication with the second communication channel in accordance with the second set of communication preferences.

16. The one or more computer-readable media of claim 15, wherein:
responsive to the inherency data indicating that the first communication channel should inherit the portion of the second set of communication preferences associated with the second communication channel, the one or more computers are further caused to, at least, set default values for the first set of communication preferences based at least in part on corresponding current values of the second set of communication preferences.

17. The one or more computer-readable media of claim 15, wherein:
responsive to the inherency data indicating that the first communication channel should inherit the portion of the second set of communication preferences associated with the second communication channel, the one or more computers are further caused to, at least:
detect an update to a value of the second set of communication preferences; and
update a corresponding value of the first set of communication preferences based at least in part on the updated value of the second set of communication preferences.

18. A computerized system, comprising:
a memory storing:
data associated with a plurality of communication channels;
a plurality of sets of communication preferences corresponding to the plurality of communication channels; and
computer-executable instructions; and
one or more modules configured at least in part by the computer-executable instructions to, at least:
reference the plurality of communication channels that each correspond to a node in a dependency graph such that at least a first communication channel for a club member and for a first club is a child communication channel that corresponds to a child node of a parent node that corresponds to a second communication channel for the club member and for a second club;

determine a second set of communication preferences of the plurality of sets of communication preferences associated with the second communication channel by accessing the parent node that corresponds to the second communication channel;

traverse the dependency graph along an edge between the child node that corresponds to the first communication channel and the parent node that corresponds to the second communication channel;

based on traversing the dependency graph, determine inherency data indicating whether the first communication channel should inherit a portion of the second set of communication preferences associated with the second communication channel;

based on the inherency data indicating that the first communication channel should inherit the portion of the second set of communication preferences associated with the second communication channel, determine a first set of communication preferences of the plurality of sets of communication preferences for the first communication channel based at least in part on the second set of communication preferences associated with the second communication channel, the first set of communication preferences being different from the second set of communication preferences;

detect an update to a value of the second set of communication preferences, wherein the value of the second set of communication preferences is updated by an authorized user who is different from the club member and different from first staff members of the first club and second staff members of the second club;

based on the inherency data indicating that the first communication channel should inherit the portion of the second set of communication preferences associated with the second communication channel and based on detecting the update to the value of the second set of communication preferences, update a corresponding value of the first set of communication preferences;

facilitate communication with the first communication channel in accordance with the first set of communication preferences; and facilitate communication with the second communication channel in accordance with the second set of communication preferences.

19. The computerized system of claim 18, wherein:

responsive to the inherency data indicating that the first communication channel should inherit the portion of the second set of communication preferences associated with the second communication channel, the one or more modules are further configured to, at least, set default values for the first set of communication preferences based at least in part on corresponding current values of the second set of communication preferences.

* * * * *